US011120333B2

(12) United States Patent
Qiao et al.

(10) Patent No.: US 11,120,333 B2
(45) Date of Patent: Sep. 14, 2021

(54) OPTIMIZATION OF MODEL GENERATION IN DEEP LEARNING NEURAL NETWORKS USING SMARTER GRADIENT DESCENT CALIBRATION

(71) Applicant: International Business Machines Corporation, Armonk, NY (US)

(72) Inventors: Mu Qiao, Belmont, CA (US); Ramani Routray, San Jose, CA (US); Abhinandan Kelgere Ramesh, San Jose, CA (US); Claire Abu-Assal, Pismo Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 15/966,819

(22) Filed: Apr. 30, 2018

(65) Prior Publication Data
US 2019/0332933 A1    Oct. 31, 2019

(51) Int. Cl.
*G06N 3/08*    (2006.01)
*G06N 3/04*    (2006.01)

(52) U.S. Cl.
CPC ............. *G06N 3/08* (2013.01); *G06N 3/0472* (2013.01)

(58) Field of Classification Search
CPC ........................................................ G06N 3/08
See application file for complete search history.

(56) References Cited

U.S. PATENT DOCUMENTS 9,519,859 B2    12/2016  Huang et al.
9,535,960 B2     1/2017  Guo et al.
(Continued)

FOREIGN PATENT DOCUMENTS

CN    101782743 A    7/2010
CN    106251375 A    12/2016
(Continued)

OTHER PUBLICATIONS

"H2O World Training 2015"; H2O Tutorials; retrieved from [https://github.com/h2oa/h2o-tutorials/blob/master/SUMMARY.md]; 2015.
(Continued)

*Primary Examiner* — Moazzam Hossain
(74) *Attorney, Agent, or Firm* — Stephen J. Walder, Jr.; Ryan G. Lewis

(57) ABSTRACT

In training a new neural network, batches of the new training dataset are generated. An epoch of batches is passed through the new neural network using an initial weight ($\theta$). An area minimized ($A_i$) under an error function curve and an accuracy for the epoch are calculated. It is then determined whether a set of conditions are met, where the set of conditions includes whether $A_i$ is less than an average area (A_avg) from a training of an existing neural network and whether the accuracy is within a predetermined threshold. When the set of conditions are not met, a new $\theta$ is calculated by modifying a dynamic learning rate ($\beta$) by an amount proportional to a ratio of $A_i$/A_avg and by calculating the new $\theta$ using the modified $\beta$ according to $\theta:\pm\theta-$ $$\left(\alpha * \frac{\partial(J(\theta))}{\partial\theta} + \beta * \int_a^b J(\theta)\partial\theta\right).$$

The process is repeated a next epoch until the set of conditions are met.

8 Claims, 4 Drawing Sheets

(56) References Cited

U.S. PATENT DOCUMENTS

| | | |
|---|---|---|
| 9,646,243 B1 | 5/2017 | Gokmen |
| 2014/0214735 A1 | 7/2014 | Harik |
| 2015/0161988 A1 | 6/2015 | Dognin et al. |
| 2017/0011280 A1 | 1/2017 | Soldevila et al. |
| 2017/0028645 A1 | 2/2017 | Shih et al. |
| 2017/0098171 A1 | 4/2017 | Kumar et al. |
| 2017/0228645 A1 | 8/2017 | Wang et al. |
| 2019/0095794 A1* | 3/2019 | Aldana Lopez ....... G06N 20/00 |

FOREIGN PATENT DOCUMENTS

| | | |
|---|---|---|
| CN | 106875002 A | 6/2017 |
| CN | 107369635 A | 11/2017 |

OTHER PUBLICATIONS

Anonymous; "Compressed Sensing for Monitoring of an Application"; IPCOM000252103D; retrieved from [http://ip.com/IPCOM/000252103D]; Dec. 15, 2017.

Anonymous; "Machine Learning for Hardware Simulation"; IPCOM000251992D; retrieved from [http://ip.com/IPCOM/000251992D]; Dec. 13, 2017.

Anonymous; "Machine Learning to Predict Advertisement Targeting Solutions"; IPCOM000252091D; retrieved from [http://ip.com/IPCOM/000252091D]; Dec. 15, 2017.

Anonymous; "Machine-Learning for Optimization of Software Parameters"; IPCOM000252023D; retrieved from [http://ip.com/IPCOM/000252023D]; Dec. 13, 2017.

Yao, Shuochao et al.; "DeeploT: Compressing Deep Neural Network Structures for Sensing Systems with a Compressor-Critic Framework"; Sensys'17 Delft, Netherlands; Nov. 2017.

\* cited by examiner

OPTIMIZATION OF MODEL GENERATION IN DEEP LEARNING NEURAL NETWORKS USING SMARTER GRADIENT DESCENT CALIBRATION

BACKGROUND

Neural networks are a set of algorithms, partially modeled on biological neural networks, that are designed to recognize patterns, such as in images and text. Neural networks are "trained" using labeled datasets or observed data. Neural networks are characterized by containing adaptive weights along paths between neurons that can be tuned by a learning algorithm that learns from observed data in order to improve the model. Deep learning algorithms rely on optimal model selection and optimization through model tuning. Gradient descent is a known optimization technique that can be used in many machine learning methods, including deep learning with neural networks. It is used to optimize improvement of the inaccuracies of the prediction of the models. Typically, multiple iterations are run descending down the gradient to reach a point of minimum error.

However, gradient descent is computationally intensive and costly in terms of computing resources and time. Deep learning neural networks are specialized models that need a large body of training data and large number of training iterations. To handle the computations, potentially specialized hardware may be needed. Further, multiple passes over the same data points (i.e., epoch) are required.

SUMMARY

Disclosed herein is a method for training a new neural network using a new training dataset, and a computer program product and system as specified in the independent claims. Embodiments of the present invention are given in the dependent claims. Embodiments of the present invention can be freely combined with each other if they are not mutually exclusive.

According to an embodiment of the present invention, a plurality of batches of a new training dataset for training a new neural network is generated. An initial value for a constant learning rate ($\alpha$) and an initial value for a dynamic learning rate ($\beta$) are set. An epoch of a plurality of epochs is passed through the new neural network using an initial value for a weight ($\theta$). Each epoch of the plurality of epochs includes a set of the plurality of batches of the new training dataset. An area minimized ($A_i$) and an accuracy for the epoch are calculated. The area minimized equals $\int_a^b J(\theta) \partial \theta$, where $J(\theta)$ is an error function and the $A_i$ is an area under the $J(\theta)$ in a range from a to b. It is then determined whether a set of conditions are met. The set of conditions includes: whether $A_i$ is less than an average area (A_avg) of areas minimized from a training of an existing neural network using an existing training dataset; and whether the accuracy is within a predetermined threshold. When the set of conditions are not met, a new $\theta$ is calculated by modifying the dynamic learning rate ($\beta$) by an amount proportional to a ratio of $A_i$/A_avg and calculating the new $\theta$ using the modified $\beta$ according to $$\theta := \theta - \left( \alpha * \frac{\partial (J(\theta))}{\partial \theta} + \beta * \int_a^b J(\theta) \partial \theta \right).$$

The passing of the next epoch through the new neural network using the new $\theta$, the calculating of the $A_i$ and the accuracy for the next epoch, the determining whether the set of conditions are met, and the calculating of the new $\theta$ are repeated for a next epoch of the plurality of epochs until the set of conditions are met.

DETAILED DESCRIPTION

Figure 1:
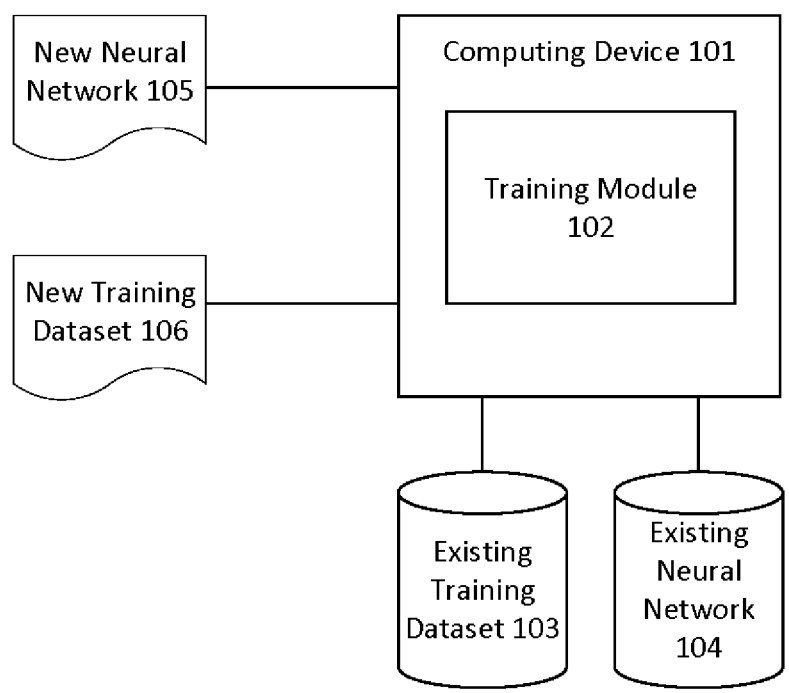
FIG. 1 illustrates a technological environment for exemplary embodiments of the present invention.

A neural network is composed of layers of computational "nodes". A deep learning neural network is composed of multiple, or deep, layers of nodes. A node combines input from a dataset with a set of coefficients, or weights, that either amplify or dampen the input, thereby assigning significance to inputs for the task the algorithm is trying to learn. These input-weight products are summed and the sum is passed through a node's activation function, such as classification, where the sum affects the ultimate outcome. How well the neural network performs the activation function is expressed as an accuracy metric. The accuracy may be improved by training the neural network using training datasets.

In the training of a deep neural network, large training datasets are passed through the neural network. Due to the size of the large training datasets, the training datasets may be divided into sample batches, with sets of the sample batches (referred to as "epochs") being iteratively passed through the neural network. A gradient descent algorithm is used to find the values of the weights that minimize the errors the weights produce. The slope, or gradient, describes the relationship between the network's error and a single weight, i.e., how the error vary as the weight is adjusted. By optimizing the weights through gradient descent, the accuracy of the neural network can be improved. The conventional weight equation (1) is as follows:

$$\theta := \theta - \alpha * \frac{\partial (J(\theta))}{\partial \theta} \qquad (1)$$

where $\theta$=weight, $\alpha$=learning rate, and $J(\theta)$=error or cost function. The derivative of $J(\theta)$ is the gradient. With each iteration in the training of the neural network, the value of the weight ($\theta$) is adjusted according to the product of the learning rate ($\alpha$) and the derivative of the error function ($J(\theta)$). The learning rate ($\alpha$) is a predetermined constant which sets the step size of each adjustment of the weight ($\theta$) between iterations. The error function ($J(\theta)$) is then calculated for a batch of the training dataset and used in the next iteration. This process is repeated until a global minimum of the error function ($J(\theta)$) is reached.

Embodiments of the present invention introduces an additional term to the weight equation as follows:

$$\theta := \theta - \left( \alpha * \frac{\partial(J(\theta))}{\partial \theta} + \beta * \int_a^b J(\theta) \partial \theta \right) \quad (2)$$

where θ=weight, α=learning rate, J(θ)=error or cost function, and β=dynamic learning rate. The adjustment of the dynamic learning rate (β) is described further below with reference to FIG. 3. The product of the dynamic learning rate (β) and the area under the error curve (i.e., the integral of J(θ) for range from a to b) is introduced into the weight equation (2). The value of this additional term is subtracted along with the product of the learning rate (α) and gradient, resulting in a larger step size than with the conventional weight equation (1), allowing the gradient descent to reach the global minimum with fewer iterations.

FIG. 1 illustrates a technological environment for exemplary embodiments of the present invention. The environment includes a computing device 101 with a training module 102 for training neural networks. The training module 102 trained an existing neural network 104 using an existing training dataset 103. When the statistical distribution of the data in a new training dataset 106 is similar to the statistical distribution of the data in the existing training dataset 103, what is learned through the training of the existing neural network 104 can be leveraged and used as a reference to train the new neural network 105. More specifically, the data learned from the convergence path during the training of the existing neural network 104 could be used as a learning parameter in the training of a new neural network 105, as described further below.

Figure 2:
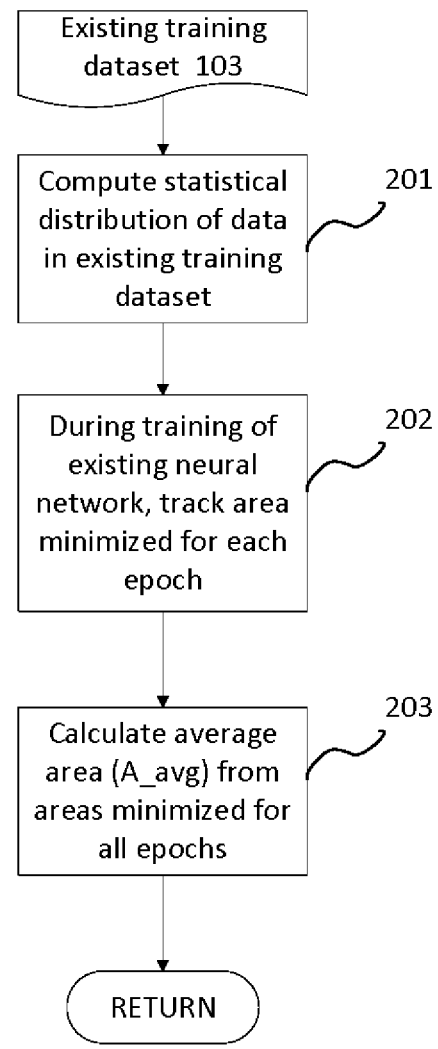
FIG. 2 illustrates an exemplary embodiment of a training of an existing neural network according to the present invention.

FIG. 2 illustrates an exemplary embodiment of a training of an existing neural network according to the present invention. For the existing training dataset 103, a statistical distribution of the data in the existing training dataset 103 is computed (201). During the training of the existing neural network 104, the area minimized (i.e., the area under the error curve or the integral $\int_a^b J(\theta) \partial \theta$) for each epoch of the existing training dataset 103) is tracked (202). An average area (A_avg) is calculated from the areas minimized for all epochs of the existing training dataset 103 (203).

Figure 3:
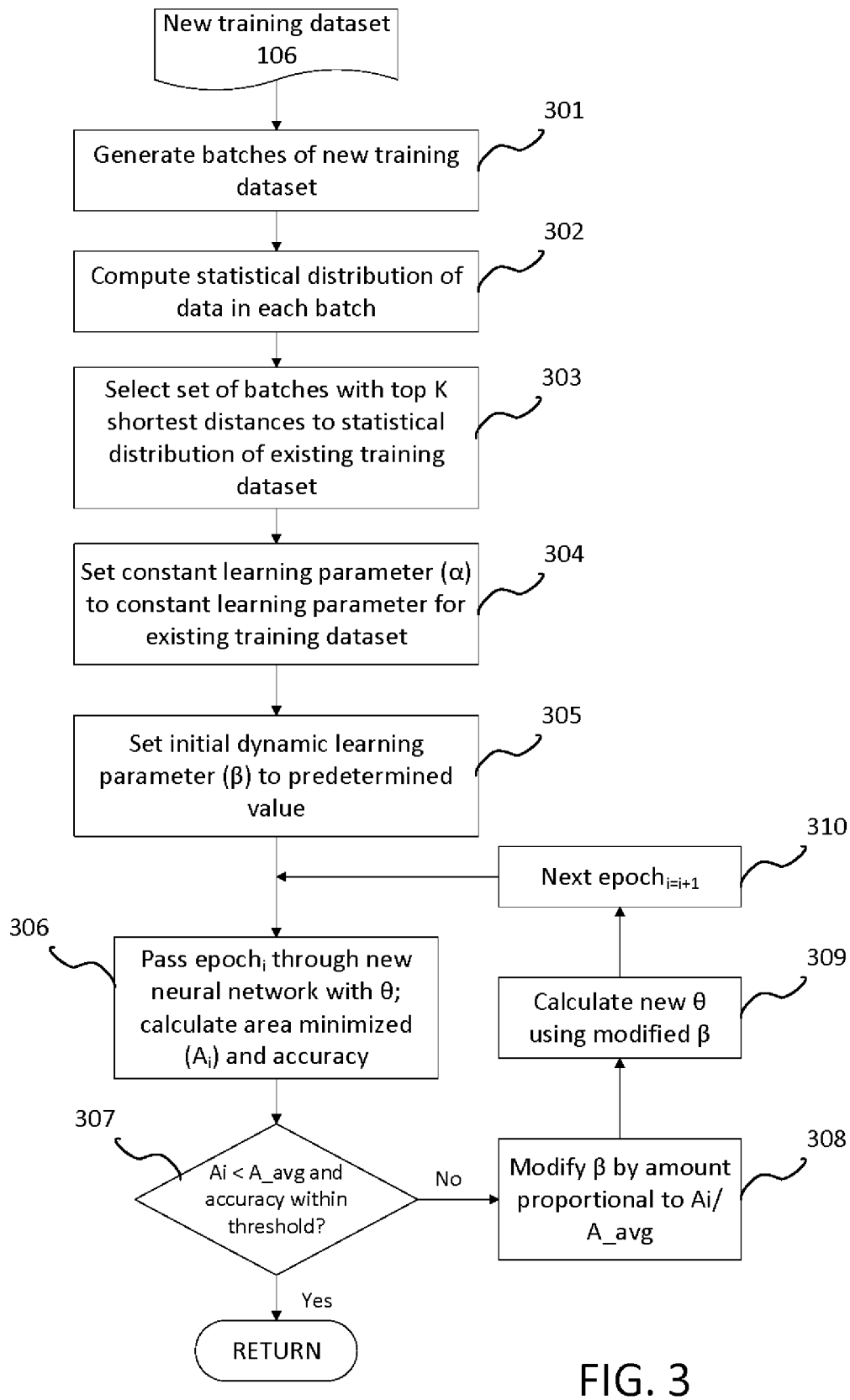
FIG. 3 illustrates the training of new neural network using data from the training of an existing neural network according to the present invention.

FIG. 3 illustrates the training of new neural network using data from the training of an existing neural network according to the present invention. Assume that the new training dataset 106 is to be used to train a new neural network 105 and assume that the new neural network 105 and the existing neural network 104 are of the same or similar domain and are for similar purposes. The training of the existing neural network 104 using the existing training dataset 103 can be used as a starting point to train the new neural network 105. For example, assume that the existing neural network 104 is in the medical domain, and its purpose is to classify documents. When the new neural network 105 is also in the medical domain and its purpose is also to classify documents, the training of the existing neural network 104 may be used as a starting point in the training of the new neural network 105. In training the new neural network 105, batches of the new training dataset 201 are generated (301), and a statistical distribution of the data in each batch is computed (302). Note that in the training of the existing neural network 104, the statistical distribution of the data in the existing training dataset 103 was computed (see block 201, FIG. 1). The batch of the new training dataset 106 with the closest similarity of statistical distribution to the existing training dataset 103 is then selected (303). In one implementation, for each batch of the new training dataset 106, a distance between the statistical distribution of this batch and the statistical distribution of the existing training dataset 103 is computed. The set of batches with the top K shortest distances are then selected, where K is a user set parameter. The initial value of the constant learning parameter (α) to be used to train the new neural network 105 is then set to the constant learning parameter (α) used to train the existing neural network 104 (304). The dynamic learning parameter (β) is set to a predetermine initial value (305). An epoch$_i$ of a plurality of epochs of the new training dataset 106 is passed through the new neural network 105 with an initial value for the weight (θ). For the epoch$_i$, an area minimized (A$_i$) and an accuracy is calculated (306). It is then determined whether a set of conditions are met. The set of conditions include: an area minimized (A$_i$) being less than the average area (A_avg) from the training of the existing neural network 104, calculated in block 203 (FIG. 2); and the accuracy being within a predetermined threshold (307). Here, the threshold may be a user-set parameter. When the area minimized (A$_i$) is less than the average area (A_avg), and the accuracy is within the threshold, then the global minimum for J(θ) has likely been reached. When the area minimized (A$_i$) is larger than the average area (A_avg) or the accuracy is not within the threshold, this indicates that the global minimum has not been reached and the training process continues. When the set of conditions are not met, the dynamic learning rate (β) is modified by an amount proportional to the ratio of A$_i$/A_avg (308). The modification of the dynamic learning rate (β) can be either an increase or a decrease in the value of P. A new weight (θ) is then calculated using the modified dynamic learning rate (β) in the weight equation (2) (309). Blocks 306-309 are repeated for the next epoch$_{i=i+1}$ (310) until the set of conditions in are met per block 307.

In the above described manner, in addition to the constant learning rate (α), another learning rate (β) is used to increase the step size used in the gradient descent, where the size of the learning rate (β) is dynamically set based on parameters gathered from the training of an existing neural network 104. The combination of the above described features allows the gradient descent to reach the global minimum with fewer iterations. This in turn results in fewer computing resources needed to train a new neural network 105, and the training can be accomplished in less time.

Optionally, an estimate of the resource consumption for training the new neural network 105 and the probable accuracy may be given based on the similarity of the data between the existing training dataset 103 and the new training dataset 106. In one implementation, the distances between the statistical distribution of the new training dataset and all the existing training datasets can be computed. The average resource consumption (e.g., training time) and the average accuracy on the top K closest existing training datasets can be used as an estimate, where K is a user set parameter.

Figure 4:
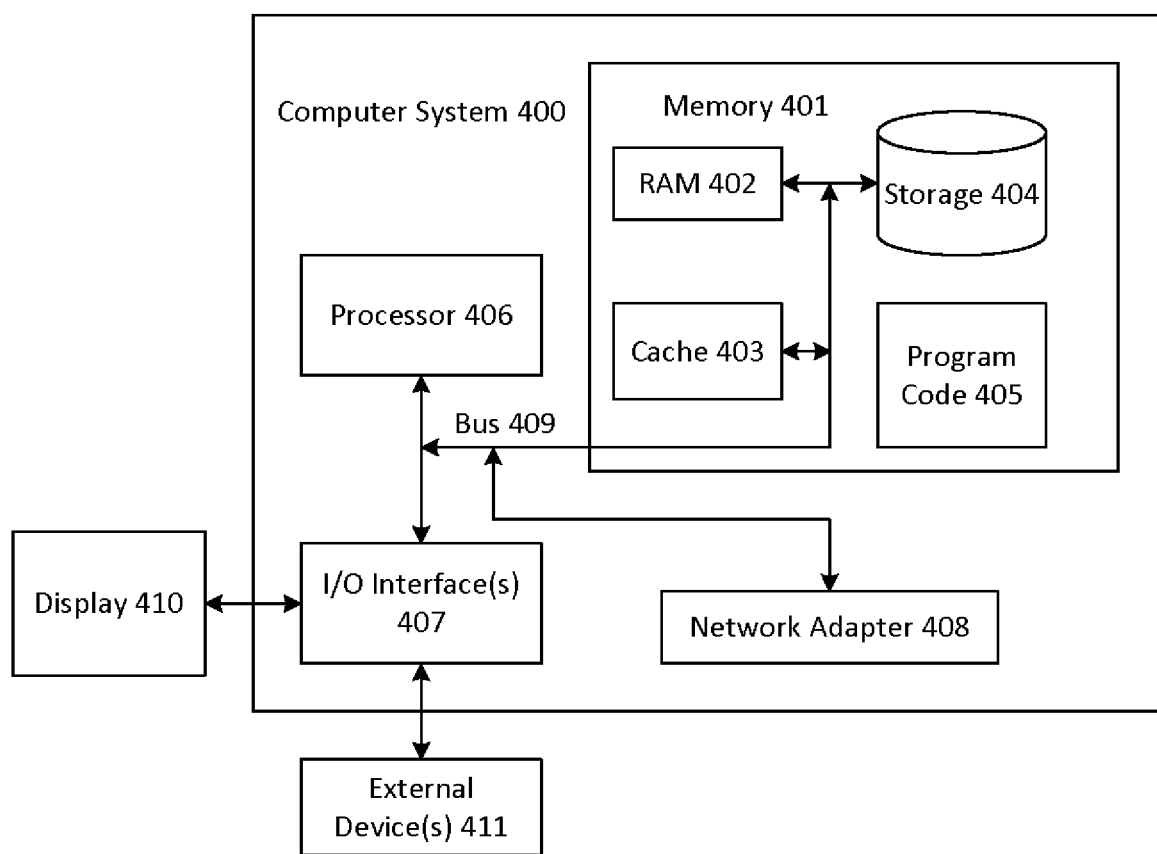
FIG. 4 illustrates a computer system according to embodiments of the present invention.

FIG. 4 illustrates a computer system according to embodiments of the present invention. One or more of the computer system may be implemented as the computing device 101. The computer system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM)

402 or cache memory 403, or non-volatile storage media 404. The memory 401 may include at least one program product having a set of at least one program code module 405 that are configured to carry out the functions of embodiment of the present invention when executed by the processor 406. The computer system 400 may also communicate with one or more external devices 411, such as a display 410, via I/O interfaces 407. The computer system 400 may communicate with one or more networks via network adapter 408.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by a processor of a computing device to cause the processor to:

generate a plurality of epochs of a new training dataset for training a new neural network to recognize patterns in data in a domain, each epoch comprising a set of batches of the new training dataset, wherein the new neural network is configured with a set of weights;

calculate a consumption of computing resources of the computing device and an average accuracy for the new neural network using the new training dataset, based on a similarity of data between the new training dataset and each of a plurality of existing training datasets trained to recognize patterns in the domain;

select an existing training dataset of the plurality of existing training datasets based on the consumption of the computing resources and the average accuracy;

obtain an average area (A_avg) for the existing neural network, the A_avg calculated from areas under an error curve minimized for all epochs used to train the existing neural network;

set an initial value for a constant learning rate (α) in the set of weights;

add an initial value for a dynamic learning rate (β) to the set of weights;

calculate an initial value for a weight (θ) using a combination of the initial value for the α and the initial value for the β;

input the epoch of the plurality of epochs into the new neural network;

process the epoch by the new neural network using the initial value for the weight (θ) and outputting an outcome;

calculate an area minimized ($A_i$) and an accuracy of the outcome for the epoch, wherein the area minimized equals $\int_a^b J(\theta)\partial\theta$, wherein $J(\theta)$ is an error function and the $A_i$ is an area under the $J(\theta)$ in a range from a to b;

determine whether a set of conditions are met, the set of conditions comprising: whether $A_i$ is less than the average area (A_avg) and whether the accuracy is within a predetermined threshold;

when the set of conditions are not met, calculate a new θ, comprising:
modify the dynamic learning rate (β) by an amount proportional to a ratio of $A_i$/A_avg, wherein the modification of the β increases a step size for a processing of a next epoch; and
calculate the new θ using a combination of the α and the modified β according to $$\theta := \theta - \left(\alpha * \frac{\partial(J(\theta))}{\partial \theta} + \beta * \int_a^b J(\theta)\partial\theta\right);$$

input the next epoch of the plurality of epochs into the new neural network; and repeat the processing of the next epoch by the new neural network using the new θ, the calculating of the $A_i$ and the accuracy of the outcome for the next epoch, the determining whether the set of conditions are met, the modifying of the β, and the calculating of the new θ until the set of conditions are met.

2. The computer program product of claim 1, wherein the setting of the initial value for the constant learning rate (α) and the adding of the initial value for the dynamic learning rate (β) comprises:

set the initial value of the α to a value of a constant learning rate used in the training of the existing neural network using the existing training dataset; and set the initial value of the β to a predetermined value.

3. The computer program product of claim 1, wherein the generating a plurality of epochs of a new training dataset for training a new neural network comprises:

compute a statistical distribution of data for each of the plurality of epochs of the new training dataset;

calculate a distance between the statistical distribution of the data for each of the plurality of epochs of the new training dataset with a statistical distribution of data in the existing training dataset; and select the epoch with a top K shortest distances, wherein K comprises a user set parameter.

4. The computer program product of claim 1, further comprising:

during the training of the existing neural network, track the areas minimized for each epoch of a plurality of epochs for the existing training dataset; and calculate the A avg from the areas minimized for the plurality of epochs for the existing training dataset.

5. A system comprising:
a processor; and
a computer readable storage medium having program instructions embodied therewith, the program instructions executable by the processor to cause the processor to:

generate a plurality of epochs of a new training dataset for training a new neural network to recognize patterns in data in a domain, each epoch comprising a set of batches of the new training dataset, wherein the new neural network is configured with a set of weights;

calculate a consumption of computing resources of the computing device and an average accuracy for the new neural network using the new training dataset, based on a similarity of data between the new training dataset and each of a plurality of existing training datasets trained to recognize patterns in the domain;

select an existing training dataset of the plurality of existing training datasets based on the consumption of the computing resources and the average accuracy;

obtain an average area (A_avg) for the existing neural network, the A_avg calculated from areas under an error curve minimized for all epochs used to train the existing neural network;

set an initial value for a constant learning rate (α) in the set of weights;

add an initial value for a dynamic learning rate (β) to the set of weights;

calculate an initial value for a weight (θ) using a combination of the initial value for the α and the initial value for the β;

input the epoch of the plurality of epochs into the new neural network;

process the epoch by the new neural network using the initial value for the weight (θ) and outputting an outcome;

calculate an area minimized ($A_i$) and an accuracy of the outcome for the epoch, wherein the area minimized equals $\int_a^b J(\theta)\partial\theta$, wherein $J(\theta)$ is an error function and the $A_i$ is an area under the $J(\theta)$ in a range from a to b;

determine whether a set of conditions are met, the set of conditions comprising: whether $A_i$ is less than the average area (A avg) and whether the accuracy is within a predetermined threshold;

when the set of conditions are not met, calculate a new θ, comprising:
 modify the dynamic learning rate (β) by an amount proportional to a ratio of $A_i$/A_avg, wherein the modification of the β increases a step size for a processing of a next epoch; and
 calculate the new θ using the modified β according to $$\theta := \theta - \left(\alpha * \frac{\partial(J(\theta))}{\partial\theta} + \beta * \int_a^b J(\theta)\partial\theta\right);$$

input the next epoch of the plurality of epochs into the new neural network; and repeat the processing of the next epoch by the new neural network using the new θ, the calculating of the $A_i$ and the accuracy of the outcome for the next epoch, the determining whether the set of conditions are met, the modifying of the β, and the calculating of the new θ until the set of conditions are met.

6. The system of claim 5, wherein the setting of the initial value for the constant learning rate (α) and the adding of the initial value for the dynamic learning rate (β) comprises:
 set the initial value of the α to a value of a constant learning rate used in the training of the existing neural network using the existing training dataset; and
 set the initial value of the β to a predetermined value.

7. The system of claim 5, wherein the generating a plurality of epochs of a new training dataset for training a new neural network comprises:
 compute a statistical distribution of data for each of the plurality of epochs of the new training dataset;
 calculate a distance between the statistical distribution of the data for each of the plurality of epochs of the new training dataset with a statistical distribution of data in the existing training dataset; and
 select the epoch with a top K shortest distances, wherein K comprises a user set parameter.

8. The system of claim 5, further comprising:
 during the training of the existing neural network, track the areas minimized for each epoch of a plurality of epochs for the existing training dataset; and
 calculate the A_avg from the areas minimized for the plurality of epochs for the existing training dataset.

* * * * *